(12) United States Patent
Vimalchand et al.

(10) Patent No.: US 8,303,696 B2
(45) Date of Patent: Nov. 6, 2012

(54) CARBON DIOXIDE ABSORBER AND REGENERATION ASSEMBLIES USEFUL FOR POWER PLANT FLUE GAS

(75) Inventors: Pannalal Vimalchand, Birmingham, AL (US); Guohai Liu, Birmingham, AL (US); Wan Wang Peng, Birmingham, AL (US)

(73) Assignee: Southern Company, Birmingham, AL (US)

( * ) Notice: Subject to any disclaimer, the term of this patent is extended or adjusted under 35 U.S.C. 154(b) by 242 days.

(21) Appl. No.: 12/833,023

(22) Filed: Jul. 9, 2010

(65) Prior Publication Data

US 2011/0005395 A1    Jan. 13, 2011

Related U.S. Application Data

(60) Provisional application No. 61/224,629, filed on Jul. 10, 2009.

(51) Int. Cl.
  *B01D 53/08* (2006.01)
  *B01D 53/12* (2006.01)
(52) U.S. Cl. ............... 96/123; 96/135; 96/150; 95/108; 95/139
(58) Field of Classification Search ............ 95/136, 95/195, 227, 236, 205, 189, 196, 197; 423/220, 423/225, 226, 228, 229, 232; 96/130, 135, 96/136, 137, 141, 143, 146
See application file for complete search history.

(56) References Cited

U.S. PATENT DOCUMENTS

| | | | |
|---|---|---|---|
| 4,937,059 A | 6/1990 | Kolts et al. | |
| 5,520,894 A | 5/1996 | Heesink et al. | |
| 6,387,337 B1 * | 5/2002 | Pennline et al. | 423/220 |
| 6,755,892 B2 | 6/2004 | Nalette et al. | |
| 6,908,497 B1 * | 6/2005 | Sirwardane | 95/136 |
| 7,699,909 B2 * | 4/2010 | Lackner et al. | 95/236 |
| 7,842,126 B1 * | 11/2010 | Dilmore et al. | 95/195 |
| 2004/0261675 A1 * | 12/2004 | Dernjatin et al. | 110/347 |
| 2006/0093540 A1 | 5/2006 | Fan et al. | |
| 2006/0211571 A1 * | 9/2006 | Iyer et al. | 502/400 |
| 2010/0282082 A1 * | 11/2010 | Butler et al. | 95/227 |
| 2011/0116979 A1 * | 5/2011 | Yamamoto et al. | 422/162 |

OTHER PUBLICATIONS

International Search Report and Written Opinion for Application No. PCT/US2010/041513 dated Apr. 27, 2011 issued by the Korean Intellectual Property Office.

* cited by examiner

*Primary Examiner* — Duane Smith
*Assistant Examiner* — Minh-Chau Pham
(74) *Attorney, Agent, or Firm* — Ryan A. Schneider, Esq.; Troutman Sanders LLP (57) ABSTRACT

Disclosed are apparatus and method to treat large amounts of flue gas from a pulverized coal combustion power plant. The flue gas is contacted with solid sorbents to selectively absorb $CO_2$, which is then released as a nearly pure $CO_2$ gas stream upon regeneration at higher temperature. The method is capable of handling the necessary sorbent circulation rates of tens of millions of lbs/hr to separate $CO_2$ from a power plant's flue gas stream. Because pressurizing large amounts of flue gas is cost prohibitive, the method of this invention minimizes the overall pressure drop in the absorption section to less than 25 inches of water column. The internal circulation of sorbent within the absorber assembly in the proposed method not only minimizes temperature increases in the absorber to less than 25° F., but also increases the $CO_2$ concentration in the sorbent to near saturation levels. Saturating the sorbent with $CO_2$ in the absorber section minimizes the heat energy needed for sorbent regeneration. The commercial embodiments of the proposed method can be optimized for sorbents with slower or faster absorption kinetics, low or high heat release rates, low or high saturation capacities and slower or faster regeneration kinetics.

20 Claims, 7 Drawing Sheets

CARBON DIOXIDE ABSORBER AND REGENERATION ASSEMBLIES USEFUL FOR POWER PLANT FLUE GAS

CROSS REFERENCE TO RELATED APPLICATION

This application claims benefit under 35 USC §119(e) of U.S. Provisional Patent Application Ser. No. 61/224,629 filed 10 Jul. 2009, which application is hereby incorporated fully by reference.

STATEMENT REGARDING FEDERALLY SPONSORED RESEARCH OR DEVELOPMENT

This invention was made with some Government support under Cooperative Agreement Number DE-NT0000749 awarded by the United States Department of Energy. The Government has certain rights in this invention.

BACKGROUND OF THE INVENTION

1. Field of the Invention

The present invention is directed generally towards a species transfer system. In particular, the present invention is designed to absorb a specific species, $CO_2$, from large amounts of flue gas exiting a power plant, and transfer the species to a controlled outlet stream, and ultimately transforming the flue gas into a $CO_2$ lean gas stream. The combustion of carbonaceous materials using air as an oxidant generates a combustion product having as major constituents $CO_2$, $N_2$ and moisture. There is a strong interest in removing $CO_2$ from the power plant flue gas for sequestration and other purposes.

2. Description of the Related Art

Generally, both solid sorbents and liquid solutions, among other methods, can be used to separate a gaseous component from a gas mixture. For some applications, solid sorbents are more desirable than liquid solutions in separating the desired gaseous component. One of these applications is to remove $CO_2$ from the flue gas emitted from power plants that use carbonaceous materials as fuel. The advantage of using solid sorbents for this application is the low energy consumption upon regeneration that improves the overall process efficiency significantly.

The process of removing $CO_2$ from flue gas generally uses sorbent in two reacting systems: one for absorption and another for regeneration. Repeated cycling of the sorbent between the absorber and regenerator (cycling sorbent from spent, to regenerated) minimizes the need for additional sorbent into the system after the initial charge, if the equipment is carefully designed to reduce attrition of the sorbent.

In the absorber, the solid sorbent comes into contact with the flue gas, which contains a number of different components including $CO_2$. In many different ways, a gas-sorbent contactor can be constructed using principles of the conventional moving bed or bubbling fluidized bed. Some mechanical mixing devices such as screw mixers, rotary kilns, and fabric filter bags also can be used to facilitate gas-sorbent contact. Yet, these conventional contactors are economically unfeasible and difficult to apply in practice to the absorption of $CO_2$ from power plant flue gas for at least the following reasons: (i) the volume of the flue gas from a power plant is large—an 880 MWe coal-burning plant can generate flue gas at a rate of more than 120 million $ft^3$/hr; (ii) the large volumetric flow rates of the flue gas essentially rules out the possibility of using a moving bed absorber, which requires the gas velocity to be below approximately 3 ft/s; and (iii) a large number of absorbers and regenerators would have to be installed and operated to handle the flue gas from a modern power plant at such low velocities.

Using a bubbling fluidized bed would cause the same problems as using a moving bed absorber and the regenerator, because the gas velocity in a bubbling bed needs to be below approximately 5 ft/s under most circumstances. Furthermore, the distributor used in a bubbling bed requires high velocity jets from the nozzles of the distributor, which has been proven to be one of the major sources for the attrition of the sorbent in the bed. As sorbents are relatively expensive, any excessive attrition can render the technology economically unfeasible. Therefore, a bubbling fluidized bed is not applicable with power plant systems.

A further complication in using solid sorbents for $CO_2$ removal is the need for the gas to remain in contact with the sorbent for a few seconds even when the absorption kinetics are relatively fast. Such relatively long contact times makes it difficult to use a fabric filter as an effective contactor for the $CO_2$ absorption, as the gas is in contact with the solid cake only for a fraction of a second when the gas flows through the fabric contactor.

Another issue that arises with absorption of $CO_2$ in flue gas by solid sorbents is the large volume of $CO_2$ generated from a power plant and relatively low absorption capacity per unit weight of the sorbent. For most sorbents, the absorption capacity (or the working capacity) is less than 10% of the mass of the sorbent. In other words, for each 10 pounds of sorbent fed, the amount of $CO_2$ absorbed is less than 1 pound. As the $CO_2$ generation rate is at least 1650 lbs for each megawatt of power generated from pulverized coal, it follows that for each megawatt generated, the sorbent required is about 15,000 lbs for 90% $CO_2$ capture. Following the same logic, for an 880 MWe power plant, the solid sorbent required is more than 13 million lbs/hr. In a system where the sorbent is circulated, the amount of $CO_2$ absorbed in the first pass is limited to about 3% depending upon the kinetics of absorption. With this limitation, a sorbent circulation rate of over 40 million lbs/hr is needed to absorb 90% $CO_2$ in the flue gas, and the sorbent needs to be circulated multiple times inside the absorber to fully utilize the sorbent before attempting regeneration. Sorbents that exhibit high exothermic heat of reaction require even higher circulation rates to moderate temperature increase in the absorber.

It is impractical to use the sorbent in a once-through process. For a commercial process, the sorbent has to be reused multiple times through a regeneration process. Handling millions of pounds of sorbent circulating at a rate of tens of millions of lbs/hr is a serious challenge for existing reactors as absorbers and regenerators. The challenge lies both in designing the internals of the reactor, and in moving a large mass of sorbent between the absorber and regeneration assemblies.

Gas—solids (catalyst, sorbent) contact processes have been developed to remove pollutants such as sulfur oxides, nitrogen oxides and mercury from power plant flue gas. EP0174109 to Tolpin et al. discloses a process for particulates, nitrogen oxides and sulfur oxides, to be removed from power plant flue gases using adsorbent material that can be regenerated. Such processes are not applicable for the removal of $CO_2$ from flue gas because $CO_2$ constitutes a much larger percentage of flue gas (up to about 15 volume %) compared to ppmv and ppbv levels of pollutants. The high $CO_2$ content in power plant flue gas requires that much larger quantities of solid sorbent be used in the removal process than the sorbent/catalyst quantities used for pollutant removal.

Another practice that has received attention is the use of multiple fixed bed vessels in which one-half of the vessels are absorbing $CO_2$ while the other half are regenerating. As disclosed in U.S. Pat. No. 6,755,892 to Nalette et al., once the regeneration is complete, the flue gas flow is switched from absorbing vessel to a vessel that has completed regeneration. The periodic switching of inlet and outlet valves and the size of the fixed beds make the scheme feasible on a smaller scale, but impractical to treat flue gas from a power plant. Also, this process is highly inefficient in terms of energy usage. For example, when the sorbent is heated to regeneration temperature, the entire vessel must be heated, and when the sorbent is cooled down to absorption temperatures, the entire vessel must be cooled down.

US Patent Publication No. 2008/0119356 to Ryu et al. discloses in detail preparation methods and required properties of dry regenerable sorbent for $CO_2$ capture from thermal power generation plants. US Patent Publication No. 2008/0119356 does not describe the method(s) for using the sorbent in a feasible commercial process.

At the Fourth Annual Conference on Carbon Capture & Sequestration, in *Dry Regenerable Carbonate Sorbents for Capture of Carbon Dioxide from Flue Gas*, Nelson et al. (paper 67, page 17 available at http://204.154.137.14/publications/proceedings/05/carbon-seq/Table % 20of % 20Contents.pdf) a highly conceptual scheme to separate $CO_2$ from power plant flue gas is disclosed. The scheme uses a heated screw conveyer as a regenerator. The sorbent is lifted to higher elevations with the screw conveyor before flowing down into a cooler and a down-flowing absorber. In such a scheme, the sorbent is partially utilized as it passes through the absorber only once per cycle. This requires unnecessarily high sorbent circulation rates between the absorber and regenerator. With such poor utilization of sorbent, a significant amount of energy is lost in heating and cooling the sorbent. Also, no provision is made to moderate the absorption temperature, which will increase significantly with exothermic heat release, and such high absorption temperatures decrease the absorption capacity of the sorbent.

Another complicating factor in developing methods for large commercial systems is that the power plant flue gas pressure is low—around ambient pressure. Even though higher pressure flue gas is helpful and highly desirable in designing power plant scale gas-sorbent contact systems, it is economically impractical to attain such higher pressures due to the large volume of flue gas from power plants. Since a large amount of flue gas is released from a modern power plant (for a power plant of size 880 MWe, the flue gas flow rate is about 34,000 ft$^3$/sec at ambient conditions), minimum power consumption becomes an important consideration in the design of an absorber to remove the $CO_2$ from the power plant flue gas.

Among different gas-solids contactors, the moving bed contactor has the potential to achieve the lowest pressure drop in the absorber because larger particle sizes and low gas velocity can be utilized. However, such a low operating pressure drop is hard to achieve in practice. Because of the requirement to impregnate chemical agents to the particles to facilitate $CO_2$ absorption, the particle size cannot be larger than 10 mm to achieve good chemical agent distribution with sufficient porosity and strength. The gas velocity cannot be too low (for example, less than approximately 3 ft/s) to avoid extreme absorber sizes. Under this circumstance, for a 2 second gas superficial residence time, the bed pressure drop is about 8 inches of water column. Taking into consideration the pressure drops in particle filtration baghouse and gas distribution, the total pressure drop for a moving bed absorber needs to be at least 25 inches of water column. For even a modest 300 MWe power plant, the required absorber cross-sectional area is over 4,000 square feet.

A bubbling bed requires an unusually high pressure drop. Under reasonable assumptions, the bubbling bed can use smaller particles (in the 3 mm range) with a gas superficial velocity of 3 ft/s and a bed height of 6 ft (for a 2 second residence time), and the pressure drop in the bed will be more than 80 inches of water column. Increasing the gas velocity for the bubbling bed will not help because, for a given gas residence time, an increase in the gas superficial velocity will increase the bed height without the benefit of decreasing the bed density. To reduce the pressure drop to 25 inches of water column, the gas superficial velocity has to be reduced to 0.4 ft/s, which would require an impractical 190 feet equivalent diameter vessel for a 300 MWe power plant.

It can be seen that a successful absorber and regeneration assembly to facilitate gas-sorbent contact and $CO_2$ removal from the flue gas of a power plant needs to consider all of the above factors. A need yet exists for removing $CO_2$ from the power plant flue gas for sequestration and other purposes. The present invention is directed to same, and resolves the above-mentioned barriers to a successful system.

BRIEF SUMMARY OF THE INVENTION

The present invention is directed generally towards a species transfer system. The present species transfer system is placed into communication with an inlet stream having a high concentration of a species. In exemplary embodiments, the inlet stream is power plant flue gas, having a high concentration of $CO_2$.

The inlet stream is subjected to a species transfer medium that transfers at least a portion of the species from the inlet stream to the species transfer medium, thus ultimately transforming the inlet stream into a $CO_2$ lean gas stream. In exemplary embodiments, the species transfer medium is a regenerable sorbent that can capture $CO_2$ from coal combustion systems, and release the captured $CO_2$ into a controlled species outlet stream for sequestration, or used for other purposes.

Upon communication of the inlet stream with the species transfer medium, the species transfer medium captures amounts of the species from the inlet stream, and the stream becomes less concentrated with the species. The inlet stream is thus ultimately exhausted as an outlet stream with a lower concentration of the species.

The species transfer medium releases the captured species to a controlled species outlet stream having a high concentration of the species. In exemplary embodiments, the controlled species outlet stream is a $CO_2$ rich gas stream that can be sent to sequestration, or used for other purposes.

In an exemplary embodiment, the present invention provides systems, apparatus and methods of operation to absorb and separate $CO_2$ from coal-fired power plant flue gas. The invention can include a circulating fluidized bed absorber and the ability to control and maintain a uniform temperature in the absorber by cooling a portion of the sorbent and recycling the sorbent to a riser reactor. In an exemplary embodiment, at the top of the riser, an internally circulating fluidized bed (ICFB) is included to further utilize the remaining absorption capacity of the sorbent by circulating the partially spent sorbent within the ICFB.

The present invention further comprises a method to regenerate the sorbent that has been used to absorb $CO_2$ in the absorber assembly of the apparatus. In the regeneration assembly, the sorbent is heated by indirectly exchanging heat with a heating surface in the regeneration assembly. In the process of heating the sorbent, the $CO_2$ absorbed by the sorbent is released by the sorbent. Due to the sorbent's sensitivity to higher temperatures and taking into consideration the preferable environment for the present invention (used in large industrial-scale operations), the preferred method of regenerating the sorbent is a fluidized bed.

The rate of sorbent withdrawn from the absorber assembly is controlled by aeration to a non-mechanical valve located in a crossover between the absorber and the regeneration assemblies. In one embodiment, the sorbent flow rate can also be controlled by controlling the pressure difference between the absorber assembly and the regeneration assembly. The sorbent transfer rate from the absorber assembly to the regeneration assembly can be controlled to match the sorbent feed rate to the absorber riser so the sorbent inventory in the regeneration assembly will be approximately constant.

The regeneration assembly also includes a sorbent cooler to cool the sorbent to the desired temperature before recycling the sorbent to the absorber assembly. In one embodiment, the sorbent is recycled back to the absorber riser by a seal leg that can meter the sorbent flow rate and limit or prevent the gas from reverse flow from the absorber assembly to the regeneration assembly.

According to an exemplary method of the present invention, the absorber assembly operates in the transport flow regime. The bulk density in the absorber assembly is typically about 0.2 lb/ft$^3$ (in a range from approximately 0.15 to approximately 0.4) and the total pressure drop in the entire absorber assembly (including disengager and baghouse) is typically 15 inches of water column (in a range from approximately 10 to approximately 25 inches of water column), depending upon the characteristics of the sorbent used. For the same conditions discussed above, the cross-sectional area of the absorber riser is approximately 300 square feet or an equivalent internal diameter of approximately 20 feet. A method of the present invention not only reduces the equipment size, but also allows for operation with low pressure drops, making the method feasible to treat flue gas from large power plants.

In another exemplary embodiment, the present invention is a species transfer system for transferring at least one species from an inlet stream having a first concentration of the species, to a controlled species outlet stream, comprising an absorber assembly having an inlet for the inlet stream and an outlet for a lean species stream having a second concentration of the species being lower than the first concentration of the species of the inlet stream, sorbent located in the absorber assembly capable of capturing at least a portion of the species from the inlet stream, a regeneration assembly having an inlet and an outlet for the controlled species outlet stream, and sorbent located in the regeneration assembly capable of releasing at least a portion of the captured species from the absorber assembly to the controlled species outlet stream, wherein the species transfer system can effectively handle an inlet stream flow rate of at least approximately 11,500 ft$^3$/sec, and wherein the species transfer system provides 90% species capture, such that the lean species stream has less than approximately 10% of the species concentration of the inlet stream.

Preferably, the overall pressure drop in the absorber assembly, from inlet to outlet, is less than 25 inches of water column, and more preferably, is less than 15 inches of water column.

Preferably, the overall temperature increase in the absorber assembly is less than 25° F.

The absorber assembly can comprise a cone section defining the inlet for the inlet stream and providing sorbent plugging limiting means, a riser section in communication with the cone section, where mixing of the inlet stream and sorbent occur, a circulation section in communication with the riser section to circulate partially spent sorbent through the inlet stream, a filter section to filter the inlet stream prior to its exhaust from the absorber assembly as the lean species stream, and a sorbent recycling section to transfer sorbent from one or more of the circulation and filter sections to the cone section.

The cone section can have a primary inlet stream inlet, and at least one secondary inlet stream inlet, wherein at least approximately 60% of the inlet stream enters the absorber assembly via the primary inlet stream inlet, and wherein the remaining portion of the inlet stream enters the absorber assembly via the at least one secondary inlet stream inlet to maximize gas-sorbent contact.

The riser section can have a cross-sectional area of approximately 300 ft$^2$ for a 300 MWe plant.

The circulation section can comprise an internally circulating fluidized bed, wherein the internally circulating fluidized bed circulates partially spent sorbent through the inlet stream until the sorbent reaches approximately its saturation level.

The filter section can comprise a baghouse to filter sorbent particulates in the inlet stream prior to its exhaust from the absorber assembly as the lean species stream.

The absorber assembly can further comprise at least one absorber cooling assembly to provide control of the temperature in the absorber assembly.

The regeneration assembly can comprise a spent sorbent heating section to drive captured species in the spent sorbent out of the sorbent, and into a regeneration assembly outlet stream, a regenerated sorbent cooling section to cool the regenerated sorbent prior to its return to the absorber assembly, a filter section to filter the regeneration assembly outlet stream prior to its exhaust from the regeneration assembly as the controlled species outlet stream, and a sorbent return section to transfer cooled regenerated sorbent from the regenerated sorbent cooling section to the absorber assembly.

In another exemplary embodiment, a species transfer system is provided, for transferring $CO_2$ from the flue gas of a power plant having a first concentration of $CO_2$, to a $CO_2$ rich gas stream, comprising an absorber assembly having an inlet for the flue gas and an outlet for a $CO_2$ lean gas stream having a second concentration of $CO_2$ being lower than the first concentration of $CO_2$ of the flue gas, sorbent located in the absorber assembly capable of capturing at least a portion (preferably a major portion) of the $CO_2$ from the flue gas, a regeneration assembly having an inlet, and an outlet for the $CO_2$ rich gas stream, and sorbent located in the regeneration assembly capable of releasing at least a portion (preferably a significant portion) of the captured $CO_2$ from the absorber assembly to the $CO_2$ rich gas stream, wherein the species transfer system can effectively handle a flue gas flow rate of at least approximately 11,500 ft$^3$/sec from a 300 MWe power plant, and wherein the species transfer system provides 90% $CO_2$ capture, such that the $CO_2$ lean gas stream has less than approximately 10% of the $CO_2$ concentration of the flue gas.

The present invention can further comprise a system for contacting power plant flue gas with solid sorbent to at least absorbing most of the $CO_2$ from the flue gas including an absorber assembly to remove portions of $CO_2$ from the flue gas comprising an absorber riser having sorbent, wherein the flue gas comes in contact with the sorbent to form at least partially spent sorbent, and wherein the sorbent and gas flow velocity in the absorber riser is in the range of approximately 10 to 40 ft/sec, an internally circulating fluidized bed (ICFB) in communication with the absorber riser, wherein the flowing flue gas comes in contact with additional sorbent, a gravity disengagement and baghouse filtration system in communication with the internally circulating fluidized bed to separate particles of the at least partially spent sorbent from the flue gas that has become progressively leaner of $CO_2$ before the lean $CO_2$ gas stream exits the absorber assembly, and a sorbent return leg to return sorbent from one or more of the internally circulating fluidized bed and baghouse filtration system to the absorber riser. The system further includes a seal pot acting as a non-mechanical valve, and a regeneration assembly to regenerate at least a portion of the at least partially spent sorbent and release captured $CO_2$ into a $CO_2$ rich gas stream, the regeneration assembly comprising a fluidized bed regenerator where the at least partially spent sorbent is heated to drive off captured $CO_2$ into the $CO_2$ rich gas stream, and where the regenerated sorbent is then cooled, and a regeneration return leg to return the regenerated and cooled sorbent back to the absorber assembly.

The flue gas can enter the absorber riser through an L-shaped rectangular cone that both limits (or preferably prevents) sorbent plugging at the flue gas entrance into the absorber riser, and promotes the mixing of flue gas with sorbent. In an exemplary embodiment, the mean particles size of the sorbent is in the range of approximately 30 to 200 microns.

The at least partially spent sorbent can near saturation levels of $CO_2$ by internally circulating the at least partially spent sorbent in the ICFB. The at least partially spent sorbent circulation rate in the ICFB can be regulated by controlling aeration to a reverse weir opening in the absorber riser.

The overall pressure drop in the absorber assembly can be less than 25 inches of water column.

The sorbent particles collected by the baghouse filtration system can flow to an absorber standpipe, wherein the at least partially spent sorbent is cooled and reinjected into the lower portion of the absorber riser to control the absorption temperature increase in the absorber riser to less than approximately 25° F.

The seal pot controls the flow of at least partially spent sorbent to regeneration assembly through aeration flow control. The seal pot can limit or prevent flow of regenerator gases into the absorber assembly. Additionally, the seal pot can limit or prevent flow of absorber assembly gases into the regenerator.

The system can further comprise a vessel having a fluidized bed section with imbedded steam heating coils and a moving bed section with imbedded cooling coils, wherein the at least partially spent sorbent is regenerated as well as cooled in the vessel, wherein the fluidized bed section with imbedded steam heating coils provides sorbent regeneration, and the moving bed section with imbedded cooling coils provides sorbent cooling.

Fluidization in the fluidized bed section can be achieved through a rectangular fluidization pad sloping downwards along the length of the vessel. The fluidization pad can also serve to divide the warmer fluidized bed section from the cooler moving bed section. Aeration to the moving bed section can facilitate flow of sorbent back to the absorber riser. The aeration gas can move downward along with the flow of sorbent. This limits or prevents mixing of cooler sorbent in the moving bed with the warmer sorbent in the fluidized bed located above the fluidizing pads which serves to divide the two sections.

The regeneration return leg can include a seal leg to limit or prevent reverse flow of flue gas into the regenerator.

The system can include its major components extending lengthwise in the form of a hollow prism with base, ends and internals taking the shape of an elevation cross-section of the component. The lengthwise extension of major components in this embodiment is subdivided into chambers with plate dividers to achieve appropriate flue gas, aeration and fluidization gas velocities, and limits or prevents reverse flow of solids leading to eventual plugging of nozzles and ducts. Such an arrangement promotes even mixing of gas and sorbent.

The width and height of various components can be similar—depending mainly upon the sorbent characteristics—irrespective of the size of the power plant. The length depends upon on the amount of the flue gas from the power plant.

In another embodiment, the present invention is a system for contacting power plant flue gas with solid sorbent, absorbing $CO_2$ at faster rates and with high exothermic heat releases, and for sorbents with lower saturation capacities, comprising an absorber assembly, a seal pot acting as a non-mechanical valve, and a regenerator. The absorber assembly can comprise an absorber riser wherein the flue gas comes in contact with regenerated sorbent; the sorbent and gas flow upward being in the 10 to 40 ft/s velocity range, a disengagement system at the top of the absorber riser to separate bulk of the partially spent sorbent from the gas phase, a baghouse to filter particles from the lean $CO_2$ gas stream before the gas stream exits the absorber assembly, a sorbent return leg through an annular space of an absorber standpipe, and a reinjection system to inject sorbent into the absorber riser where the upward flowing flue gas comes in contact with additional partially spent sorbent. The regenerator can comprise a fluidized bed regenerator with a central downcomer through which the regenerated sorbent exits the regenerator, a cyclonic baghouse and a cooler to filter and cool a $CO_2$ rich stream, a regenerated sorbent cooler to cool the warm sorbent from the regenerator to lower temperatures suitable for feeding to the absorber riser, and a return leg to feed the regenerated and cooled sorbent back to the absorber assembly.

The characteristics of the sorbent of this system necessitate high global sorbent circulation rates between the absorption and regeneration systems.

A disengager efficiency based on particle characteristics can balance the distribution of sorbent back to the annular space of absorber standpipe (return leg) and absorber baghouse. The sorbent particles collected by the disengager can flow down the annular space of the Absorber Standpipe. The sorbent can be cooled in the annular space of the absorber standpipe by cooling coils.

Cooled sorbent from the absorber standpipe can be reinjected into the absorber riser at various elevations to ensure the absorption temperature increase in the absorber riser is less than preferably 25° F. The sorbent reinjected into the absorber riser can also increase the sorbent loading to near saturation levels of $CO_2$. Sorbent reinjection rates at each elevation can be effectively regulated by controlling the aeration to a reverse weir opening in the absorber riser.

The nearly spent sorbent in the annular space of the absorber standpipe can flow to the seal pot between the absorber assembly and regenerator. The flow can be regulated by an L-valve to maintain the sorbent inventories in the absorber assembly and regenerator.

The seal pot acts as a non-mechanical regulating valve controlling the flow of sorbent to regenerator through aeration flow control, and at the same time limits or prevents reverse flow of regenerator gases into the absorber assembly, and vice versa.

The sorbent can be regenerated in an upward flowing fluidized bed with steam heating coils imbedded in the fluidized bed. The fluidized bed ensures uniform bed temperature and limits or prevents any localized overheating of sorbent, which is detrimental to sorbent integrity.

The regenerated sorbent can overflow into a central duct acting as a downcomer, and exit the regenerator vessel. The inventory in the regenerator is maintained by controlling the level in the regenerator downcomer.

The regenerated sorbent can flow to an external moving bed sorbent cooler with imbedded cooling coils. The aeration with flue gas to moving bed facilitates flow of sorbent back to the absorber riser, and the aeration gas moves downward along with the flow of sorbent. The return leg can incorporate an L-leg to limit or prevent reverse flow of flue gas into the regenerator. The sorbent flow through the L-leg can be aided by aeration with flue gas.

Other aspects and features of embodiments of the present invention will become apparent to those of ordinary skill in the art, upon reviewing the following detailed description in conjunction with the accompanying figures.

BRIEF DESCRIPTION OF THE FIGURES

The various embodiments of the invention can be better understood with reference to the following drawings. The components in the drawings are not necessarily to scale, emphasis instead being placed upon clearly illustrating the principles of the various embodiments of the present invention. In the drawings, like reference numerals designate corresponding parts throughout the several views.

DETAILED DESCRIPTION OF PREFERRED EMBODIMENTS

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring to the figures, the present invention 10 preferably comprises an absorber assembly 100 and a regeneration assembly 200. The absorber assembly 100 comprises a cone section 110, a riser section 120, a circulation section 130, a filter section 140, and a sorbent recycling section 150. The regeneration assembly 200 comprises a spent sorbent heating section 210, a regenerated sorbent cooling section 220, a filter section 230, and a sorbent return section 240.

Figure 1:
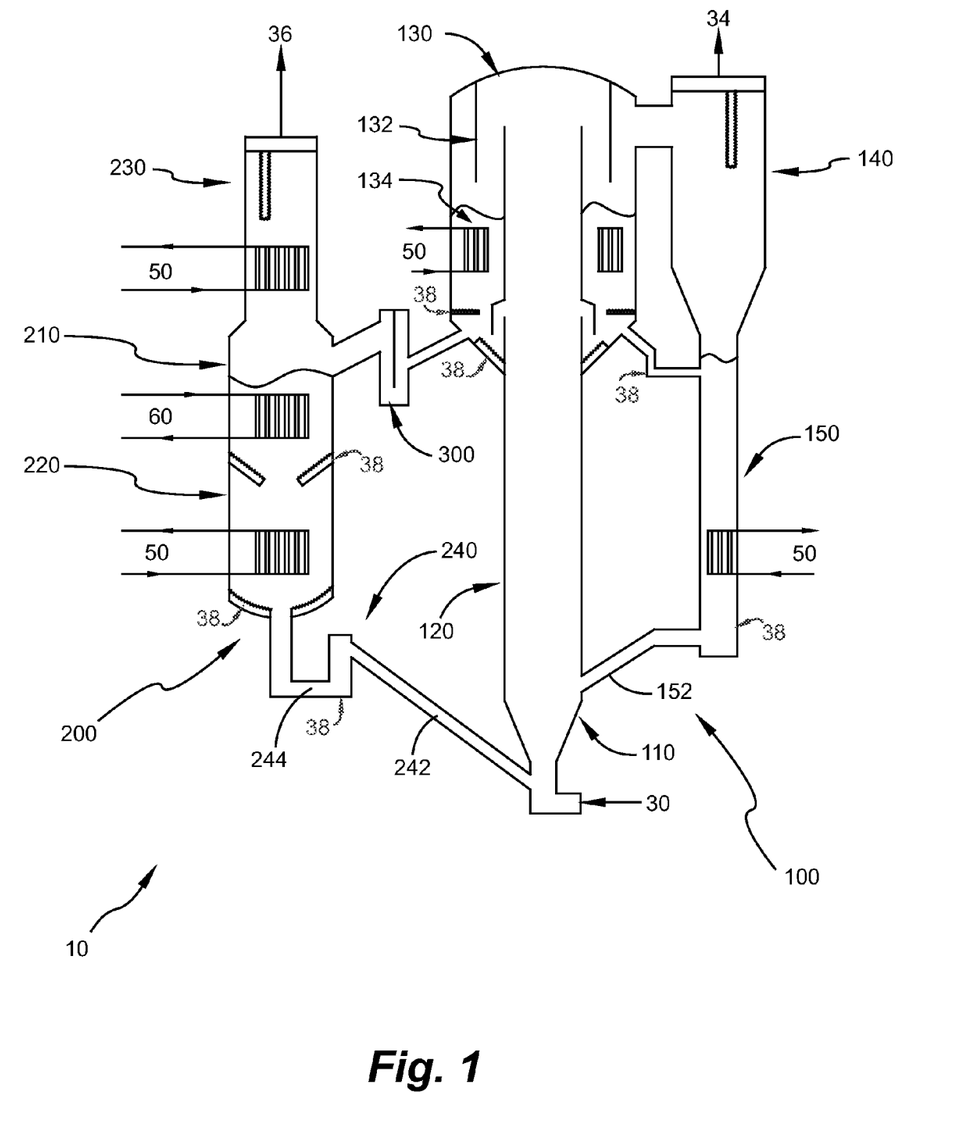
FIG. 1 is a schematic illustration of the absorber and regeneration assemblies of present invention according to a preferred embodiment for sorbents that exhibit slower kinetics, slower exothermic heat of reaction and low sorbent capacity utilization in a single pass.

In preferred form, the invention 10 provides systems, apparatus and processes to absorb $CO_2$ from power plant flue gas. FIG. 1 is a schematic illustration of the absorber and regeneration assemblies of present invention according to a preferred embodiment for sorbents that exhibit slower kinetics, slower exothermic heat of reaction and low sorbent capacity utilization in a single pass. Such sorbents necessitate higher internal sorbent circulation within the absorber assembly to maximize sorbent capacity utilization and comparatively less global circulation through absorber-regeneration assemblies.

Figure 4:
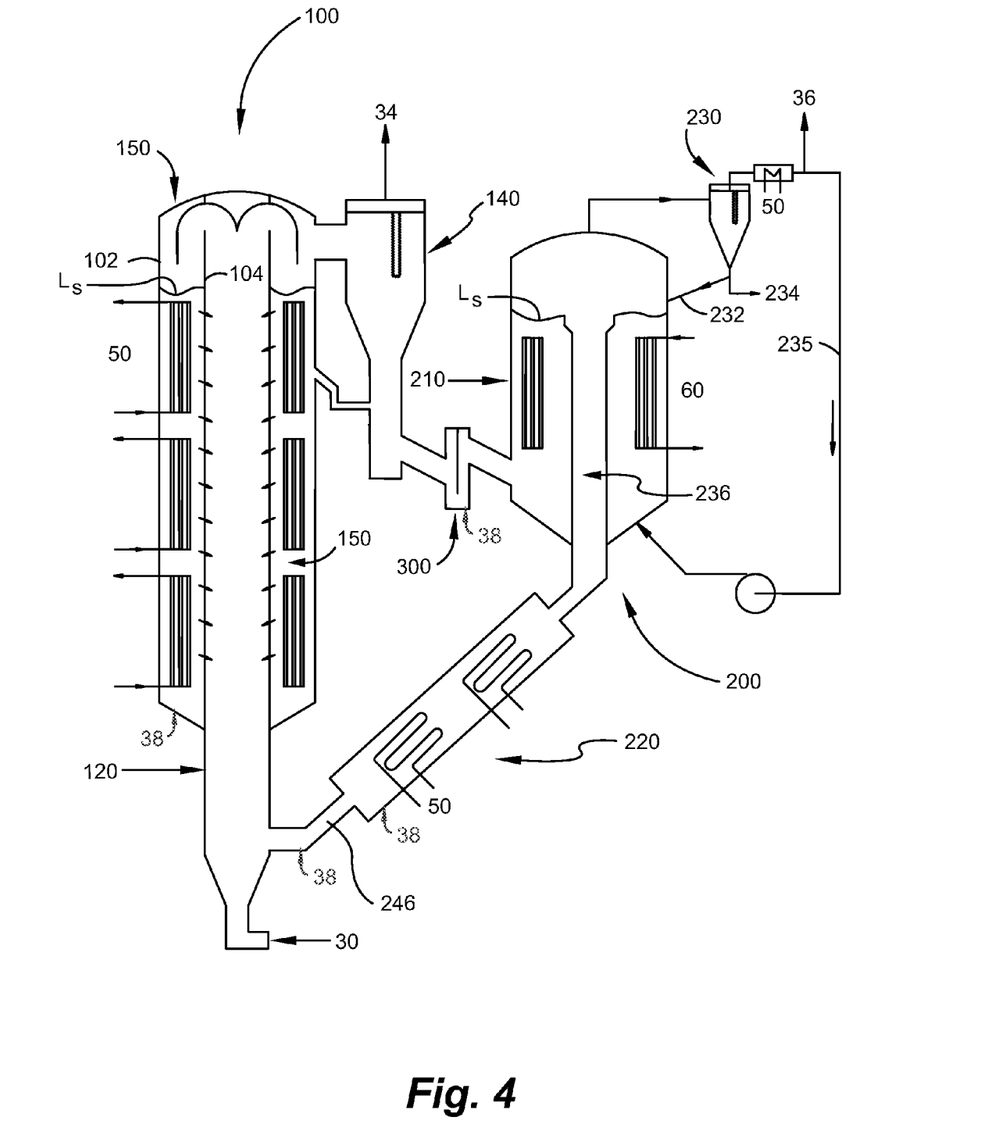
FIG. 4 is a schematic illustration of the absorber and regeneration assemblies of present invention according to another preferred embodiment for sorbents that exhibit faster kinetics, higher exothermic heat of reaction and higher sorbent capacity utilization in a single pass.

FIG. 4 is a schematic illustration of the absorber and regeneration assemblies of present invention according to another preferred embodiment for sorbents that exhibit faster kinetics, higher exothermic heat of reaction and higher sorbent capacity utilization in a single pass. Such systems require reinjection of cooled sorbent into the absorber assembly at various elevations for temperature control and methods to handle higher global sorbent circulation rates.

As shown in FIG. 1, the invention comprises an absorber riser section 120 where the inlet gas 30, here, flue gas 30 from a power plant will feed into the absorber assembly 100 through a bottom cone section 110. The $CO_2$ in the flue gas will come in contact with regenerated sorbent 20 from the regeneration assembly 200 via the sorbent return section 240. The embodiment shown in FIG. 1 is applicable for sorbents 20 with slower kinetics, low exothermic heat release, low sorbent utilization capacity in the first pass, and for sorbents with high saturation capacities.

Figure 2A:
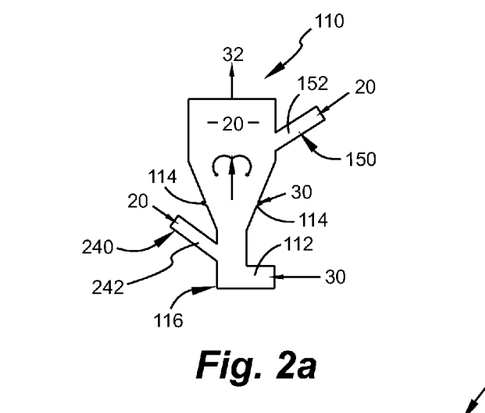
FIGS. 2a and 2b illustrate side and perspective views, respectively, of a preferred configuration of the bottom cone section of the absorber assembly according to a preferred embodiment of the present invention.
Figure 2B:
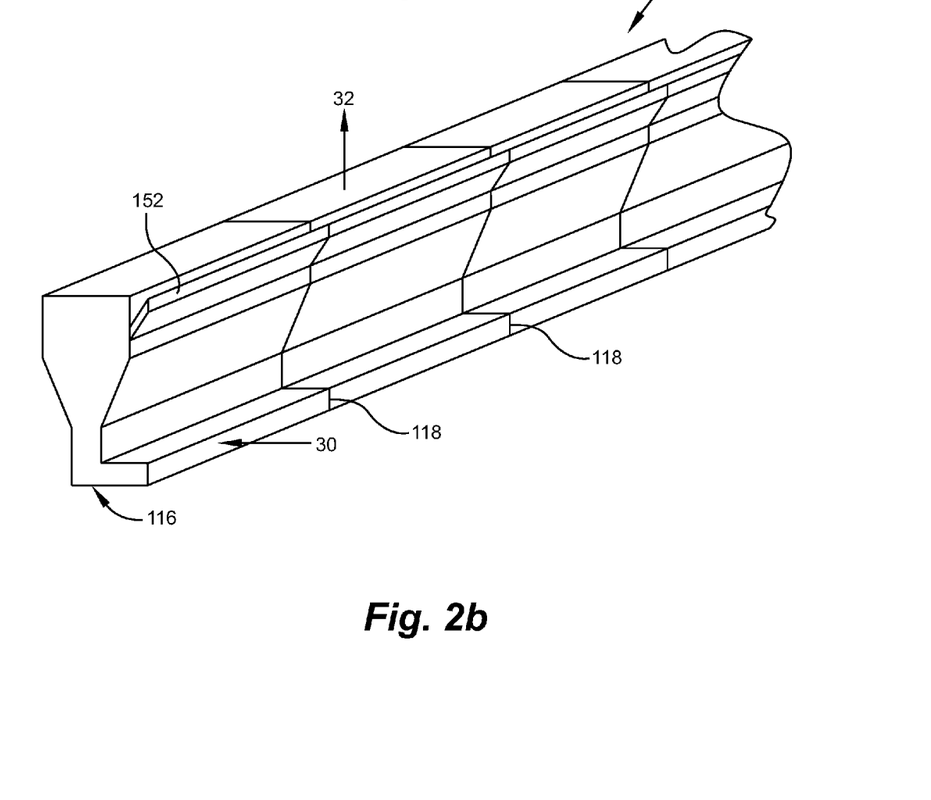

In a preferred embodiment, at the bottom of the absorber assembly 100 is the bottom cone section 110, being a rectangular cone (the rectangular cone term used is essentially an inverted hollow triangular prism, inverted triangles at the ends joined by rectangular faces) shape, as illustrated in FIG. 2.

FIGS. 2a and 2b illustrate side and perspective views, respectively, of a preferred configuration of the bottom cone section of the absorber assembly. Major portion of the flue gas 30 enter through an L-valve shaped arrangement to prevent reverse flow of sorbent into the inlet duct. During trips and shutdown, the sorbent settles in the cone section and this configuration facilitates refluidization of settled sorbent and avoids plugging problems. The jetting action of the flue gas through the throat of the cone initiates good mixing of gas and sorbent.

The majority of the flue gas 30 will feed into a primary port 112 at the bottom of the cone section 110. Some of the flue gas 30 will be injected into the cone section 110 of the absorber assembly 100 through one or more secondary ports 114 in the rectangular wall of the cone section 110 to promote gas-sorbent contact. A sorbent-gas mix 32 exits the cone section 110, entering the absorber riser section 120.

In a normal operating mode, approximately 60-90% of the flue gas 30 will flow into the absorber through the nozzle/center throat 112 of the cone section 110. The flue gas 30 enters the cone section 110 through an L-shaped inlet 116 to facilitate fluidization and mixing in the cone section 110 and prevent plugging of the inlet duct. The L-shaped inlet 116 extends along the entire length of the rectangular cone. When the system trips or shutdown, the sorbent in the absorber riser section 120 settles down in the cone section 110. The L-shaped inlet 116 makes it possible to blow the sorbent back into the absorber riser section 120 upon resumption of operations. The throat of the cone is designed to achieve sufficient jetting velocity that promotes vigorous mixing of sorbent and flue gas. Since the overall bulk density is low in the center where the flue gas is injected, the overall pressure drop in the absorber assembly 100 will be low too.

The L-shaped inlet 116 that preferably extends along the entire length of the apparatus, as shown in FIG. 2, can comprise multiple chambers with plate dividers 118. The length of each chamber is chosen to achieve high velocity and even flow of flue gas through each chamber, and limit or prevent any reverse flow of sorbent into the inlet duct during normal operation. This configuration of chambers with dividing plates can be used with other individual equipment components of the present invention. This concept ensures that aeration and fluidization gases are appropriately distributed throughout the length of each vessel as the length of the vessel (FIGS. 2 and 3) is dictated by the amount of flue gas from the power plant that needs to be treated.

Figure 3A:
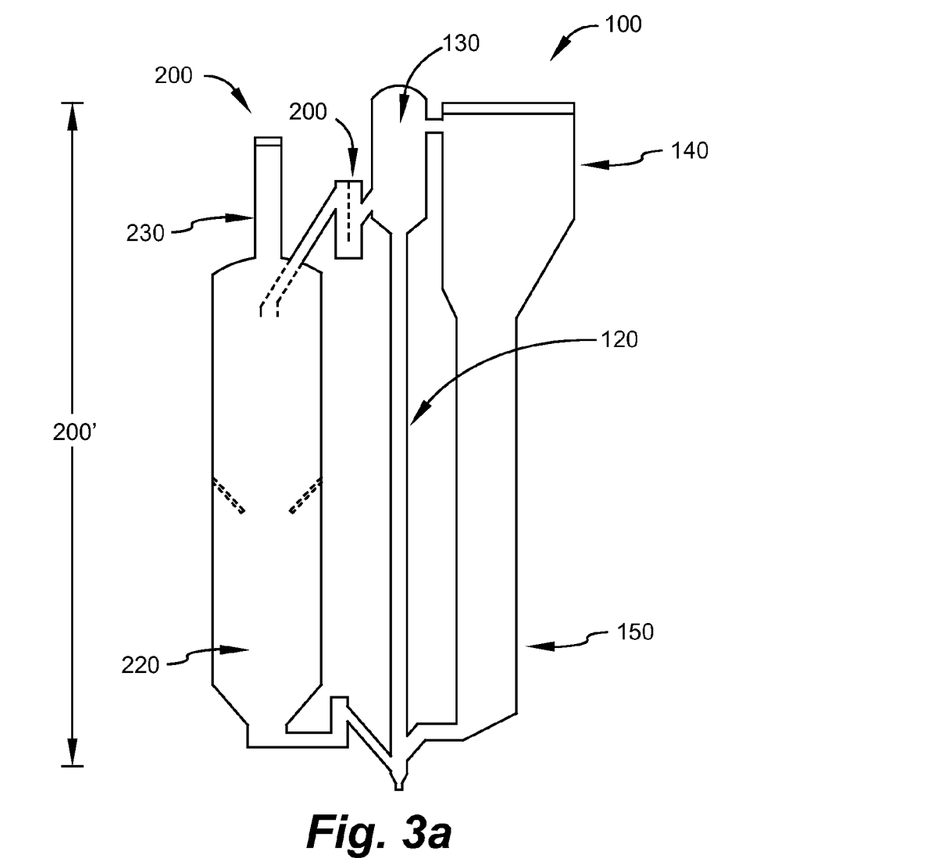
FIGS. 3a and 3b illustrate elevation and plan view, respectively of various vessels in the schematic presented in FIG. 1, according to a preferred embodiment of the present invention. The sizing information relates to treating flue gas from a 300 MWe plant.
Figure 3B:
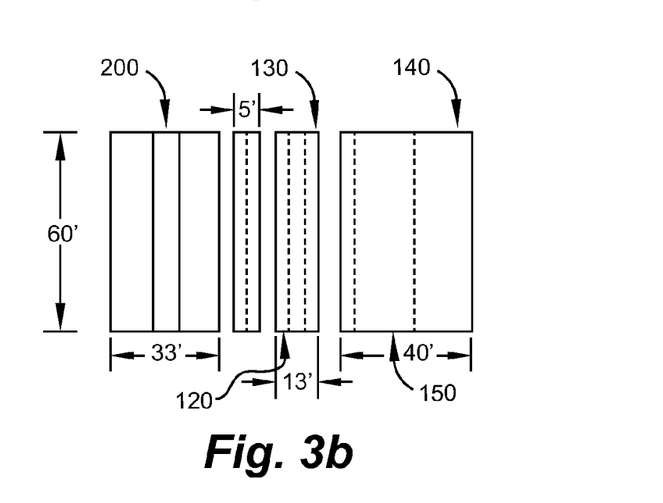

FIGS. 3a and 3b illustrate elevation and plan view, respectively of various vessels in the schematic presented in FIG. 1. The height and width of various vessels as illustrated mainly depends upon the sorbent characteristics and independent of the amount of the flue gas that is treated. The lengths of various equipment in the process are nearly the same, and are determined by the size of the power plant generating the flue gas. The sizing information examples in FIGS. 3a and 3b is for treating flue gas from a 300 MWe plant.

Returning to FIG. 1, as the $CO_2$ concentration in the flue gas is highest at the absorber assembly inlet, and the freshly regenerated sorbent has the highest absorption capacity, the initial reaction rate in the rectangular cone section 110 is the highest. The heat generation rate at the bottom of the absorber assembly is also the highest. The present invention makes it possible for a portion of the sorbent collected from the absorber filter section 140 to be cooled in the absorber sorbent recycling section 150 via a cooling assembly 50, and returned to the lower portion of the absorber assembly 100 (which can be cone section 110) via return 152 where the partially spent, cooled sorbent mixes with the flue gas and regenerated sorbent so that the temperature rise in the absorber assembly 100 can be maintained, preferably, to less than approximately 25° F. for those sorbents that exhibit highest exothermic heat of reaction.

In an exemplary embodiment, a small fraction (about 10 to 20%) of the sorbent captured by a disengagement system 132 at the top of the absorber riser section 120 and the absorber filter section 140 (which can be the circulation section 130) is directly recycled to the bottom of the absorber assembly 100 to maintain absorber assembly 100 temperature. The recycle also increases the sorbent's absorption capacity. The sorbent is fully utilized as it nears its saturation capacity. The degree of recycle of spent sorbent to lower portions of the absorber assembly 100 primarily depends upon the characteristics of the sorbent, especially the kinetics of absorption and exothermic heat release. The recycle of sorbent to lower portions of the absorber assembly 100 is limited in some embodiments to minimize the overall pressure drop in the absorber assembly 100.

To increase the sorbent absorption levels to near saturation, the circulation section 130, preferably an ICFB, can be incorporated as part of the absorber assembly 100 top section. The ICFB 130 circulates partially spent sorbent near the top of the absorber assembly 100 until the sorbent reaches near saturation levels of $CO_2$. The nearly saturated sorbent then flows to the regeneration assembly 200. Regenerating a sorbent nearly saturated with $CO_2$ decreases significantly the regeneration heat energy required, as well as the global circulation of sorbent between the absorber assembly 100 and regeneration assembly 200.

Figure 6:
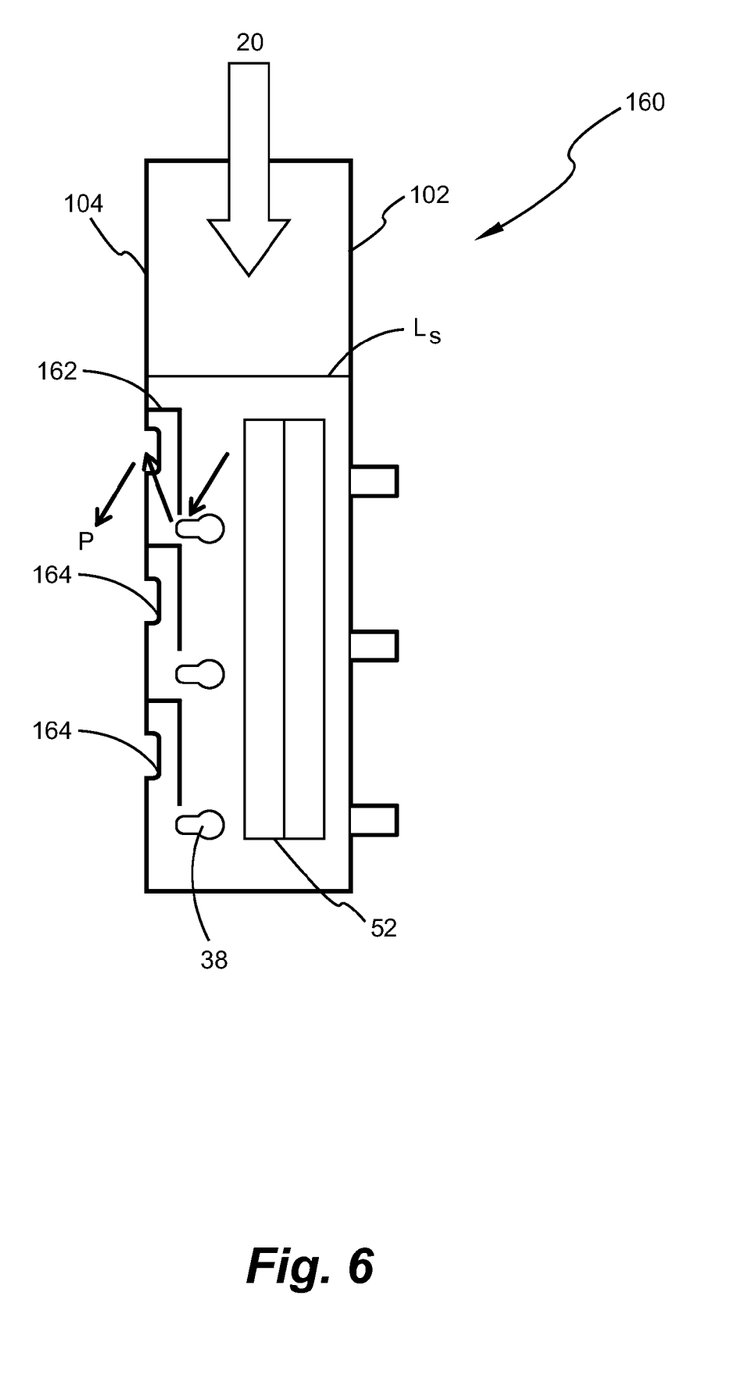
FIG. 6 is an illustration of reinjected sorbent flow control through aeration control according to a preferred embodiment of the present invention.

The ICFB 130 can comprise a disengagement section 132 near the top and the disengaged sorbent collects in the ICFB downcomer 134 below the disengagement zone. The sorbent is cooled in the ICFB downcomer 134 and reinjected into the top section of the absorber assembly 100. Reinjected sorbent flow control, similar to that illustrated in FIG. 6, 160 can be provided, wherein the reinjection rate is effectively controlled by controlling aeration gas 38 to a reverse weir section 162 (along the absorber riser section 120 as illustrated in FIG. 6) in the lower portion of the ICFB 130. Sorbents that have slower kinetics as well as sorbents with high saturation capacities relatively spend more time circulating in the ICFB 130 when compared with global circulation between the absorber assembly 100 and regeneration assembly 200.

Another method of directly recycling partially spent solid sorbent in the absorber assembly 100 is to separate a fraction of the sorbent at the top of the absorber assembly 100 and return it to lower sections of the absorber assembly 100 at various elevations. One preferred embodiment for such a scheme is illustrated in FIG. 4. This scheme is suitable for sorbents that exhibit faster kinetics, higher exothermic heat releases and higher absorption capacity in the first pass. In this embodiment, an annular space between outer 102 and inner 104 shells of the absorber assembly 100 is used to accumulate and return the sorbent to the absorber riser section 120. The sorbent separated by gravity or impaction at the top of the absorber assembly 100 falls into the annular space (absorber sorbent recycling section 150). In the annular space, a cooling assembly 50 being, for example, cooling surfaces 52, can be provided to cool the sorbent to the desired temperature that then will moderate the temperature in the absorber assembly 100.

Figure 5:
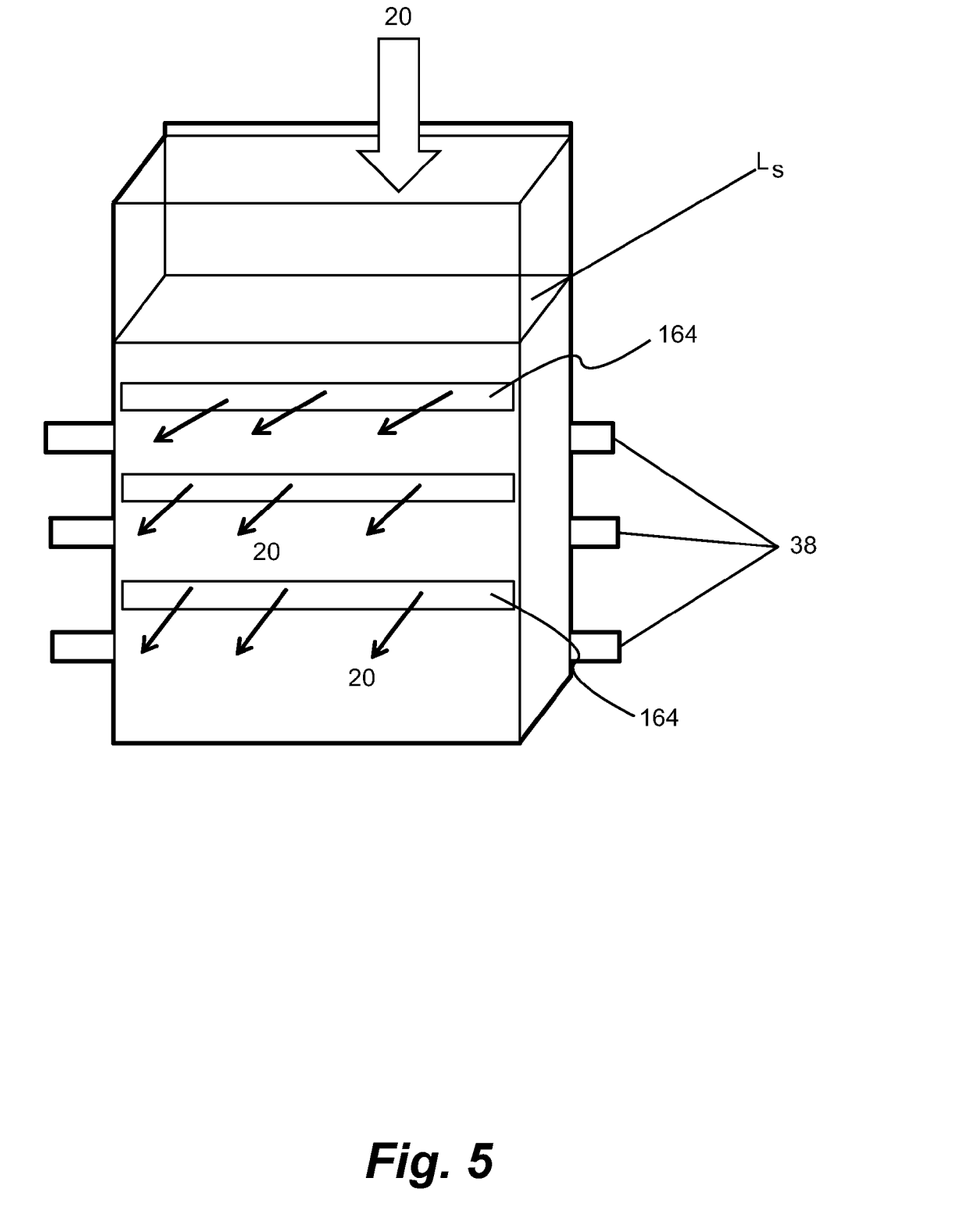
FIG. 5 is an illustration of cooled sorbent reinjected into the absorber assembly for temperature control and to fully utilize the sorbent capacity in the absorber assembly according to a preferred embodiment of the present invention.

In a preferred embodiment to moderate the temperature throughout the height of the absorber assembly 100, the cooled sorbent in the annular space is injected at a desired rate into the absorber assembly 100 through the slots that communicate between the annular space and the absorber riser section 120 as shown in FIG. 4, and detailed in FIGS. 5 and 6. As shown in FIG. 5, disengaged sorbent 20 falls, and accumulates at a level $L_S$. Levels of sorbent in the absorber assembly 100 and the regeneration assembly 200 are also shown in FIGS. 1 and 4 (with FIG. 4 indicating same by the reference $L_S$). Aeration gas 38 flows through the sorbent 20, and the sorbent flows into the absorber riser section 120 through slots 164. As shown in FIG. 6, disengaged sorbent 20 falls into the annular space between the outer 102 and inner 104 shells of the absorber assembly 100. A reverse sealing weir 162 controls sorbent flow rate through slots 164, presenting a sorbent flow path P therethrough. The cooled sorbent has some additional absorbing capacity that can be used to absorb $CO_2$ from the flue gas in addition to controlling the temperature throughout the absorber assembly 100.

The recycle of the sorbent directly to the absorber assembly 100 essentially makes the absorber assembly 100 much like a countercurrent flow reactor to maximize the sorbent capacity and moderate the temperature. The amount of sorbent recycled is essentially controlled by the aeration rate in the annular space, and the design of the sorbent discharge slots 164. The sorbent discharge slots 164 have sealing capability to seal against the flue gas in the absorber assembly 100 from short-circuiting through the annular space to the filter section 140 downstream.

One such design, which was also used in the ICFB, is illustrated in FIG. 6. In addition to sealing against the gas bypass, the reverse weir 162 in FIG. 6 prevents the sorbent from automatically flowing out of the annular space and into the absorber assembly without any control. With the weir apparatus 162 and controls developed, the sorbent only flows whenever the aeration gas is activated and the sorbent flow rate is effectively controlled by controlling the aeration gas rate.

In the embodiments of the present invention in FIGS. 1 and 4, the sorbent is separated from the gas by gravity disengagement first, and then by a filter. The details of the two step gas-sorbent separation depends on the physical characteristics of the solid sorbent used, such as size distribution, shape and bulk and particle densities. The separation of gas and sorbent is mainly accomplished by gravity. For a sorbent particle size in the range of approximately 30-200 microns, gravity separation can attain an efficiency of up to approximately 90%. The separation efficiency necessary will depend on the required sorbent flow rate back to the absorber riser section 120 through either the ICFB (FIG. 1) or the annular space (absorber sorbent recycling section 150 in FIG. 4). One of skill in the art can size the disengagement space for an appropriate gas velocity to achieve the desired separation efficiency. The present two step separation process, gravity disengagement (bulk sorbent separation) and filtration, minimizes attrition, erosion and the pressure drop.

In both configurations shown in FIGS. 1 and 4, a baghouse preferably is used as a filter to separate the finer sorbent from the $CO_2$ lean gas phase 34 before the gas exits the absorber. The flue gas 34 exiting the absorber filter is low in $CO_2$ concentration, and can be discharged to the atmosphere. The sorbent separated from the disengagement and filter sections recycles back to the bottom of the absorber assembly, as well as flows to the regeneration assembly.

The sorbent inventory in the absorption assembly can be maintained by maintaining the sorbent level in the ICFB (FIG. 1) and in the annular space of the absorber sorbent recycling section 150 (FIG. 4). As the overall sorbent inventory of the system 10 preferably is constant, any excess inventory in the absorption assembly (higher level) indicates lower inventory levels in the regeneration assembly. The inventory imbalance can be corrected by controlling the sorbent flow between the absorber and regeneration assemblies through an absorber-regenerator transfer assembly 300.

According to exemplary methods, the absorber assembly operates in the transport flow regime. The bulk density in the absorber riser section 120 is estimated at approximately 0.2 lb/ft$^3$, and the total pressure drop in the absorber assembly is estimated typically at 15 inches of water column—including the absorber riser section 120, disengager and the filtration baghouse (6 inches water column for the absorber riser section 120, 5 inches water column for the disengager and ICFB, and 4 inches water column for the filtration baghouse). For sorbents that exhibit high exothermic heat of reaction, the total pressure drop in the absorber assembly will be as high as 25 inches of water column—as higher sorbent circulation rates are necessary through the absorber riser to moderate the reacting mixture temperature. The pressure drop does not appreciably change with an increase in power plant size and flue gas flow rate, as the increased flue gas flow rate increases the length of the vessels that do not impact pressure drop. The capital and operating costs with such low pressure drop is within reason.

To control the sorbent flow rate to the regeneration assembly, it is preferred that the sorbent flow through the absorber-regenerator transfer assembly 300, which can be a non-mechanical valve, such as a seal pot. The pressure difference across the non-mechanical valve can be controlled by the sorbent level in the ICFB (FIG. 1) or the sorbent level below the baghouse (FIG. 4) and the aeration rate of the aeration gas 38 on either side of the seal pot. By controlling the pressure difference across the valve, one can control the sorbent flow rate to the regenerator.

In a preferred embodiment, the regeneration assembly 200 comprises a spent sorbent heating section 210 and a regenerated sorbent cooling section 220. The spent sorbent heating section 210 has a heating assembly 60 since a preferred method of sorbent regeneration or driving the absorbed $CO_2$ out of the sorbent is to heat-up the sorbent to a desired relatively high temperature. At the preferred regenerator bed operating temperature, the sorbent has a very low $CO_2$ retention capacity. The regeneration assemblies presented in FIGS. 1 and 4 preferably have no temperature limitations in terms of operation. However, one skilled in the art can select proper materials of construction for the desired sorbent regeneration temperatures.

In a preferred configuration, the sorbent out of the absorber assembly 100 feeds into the heating section 210 of the regeneration assembly 200. The heating section 210 of the regenerator can operate in a fluidized mode. In an exemplary embodiment of the heating assembly 60, heating coils can be embedded in the fluidized bed to provide uniform sorbent particle and bed temperatures, and limit or prevent localized overheating of sorbent. This can be critical as the sorbents are typically regenerated at as high a temperature as the sorbent properties will allow. Exceeding such temperature is detrimental to sorbent integrity.

In essence, the entire bed behaves like a kettle full of boiled water. The majority of the fluidization gas comes from the $CO_2$ released from the sorbent itself. Additionally, recycled $CO_2$ can be added to fluidize the sorbent as necessary. Depending on application as well as the sorbent's regeneration characteristics, the desorbed $CO_2$ can be cooled by a cooling system 50 before filtration (FIG. 1) or after filtration (FIG. 4).

A regenerated sorbent cooling section 220 is provided to cool the sorbent before feeding the sorbent into the absorber riser section 120 via return 242 of the sorbent return section 240. One method of cooling the sorbent is to provide a cooling assembly 50 immediately below the heating section 210 of the regenerator as shown in FIG. 1. The method presented in FIG. 1 is suitable for sorbents that require relatively low global circulation rates between the absorber and regeneration assemblies, as well as for sorbents with relatively faster regeneration kinetics. The sorbent out of the heating section 210 can then flow into the cooling section 220 under gravity.

Since the heating section is fluidized and therefore generally uniform in temperature throughout the bed in the heating section, the sorbent can be withdrawn from any part of the bed, and, as in FIG. 1, withdrawing sorbent from the bottom of the regeneration heating section 210 could be a most convenient option. The cooling section is operated as a moving bed (FIG. 1) that requires minimum aeration. The aeration gas 38 can be flue gas, and all the flue gas used for aeration in this section can be entrained by the downward flowing sorbent. No aeration gas needs to flow into the heating section. In commercial operation, a preferred method to limit or prevent the gas from flowing upwards into the heating section can be to regulate the aeration gas pressure, thereby controlling the gas flow rate to minimum aeration.

In another embodiment of the present invention, the sorbent can be withdrawn from the top of the heating section 210 of the regenerator as shown in FIG. 4. This method is preferred for sorbents that require relatively high global circulation rates between the absorber and regeneration assemblies, as well as for sorbents with relatively slower regeneration kinetics. Certain sorbents that exhibit faster absorption kinetics may have slower regeneration kinetics. The spent sorbent enters the regenerator in a lower portion of the fluidized bed. The regenerated sorbent overflows into a central downcomer duct 236 that extends through the entire length of the regenerator vessel of FIG. 4.

As sorbent absorbs $CO_2$ selectively, the desorbed gas from the regenerator is essentially a pure $CO_2$ stream 36. The warm $CO_2$ rich gas stream 36 exiting the regeneration assembly 200 entrains small amounts of finer sorbent which are filtered in the filter section 230, preferably a cyclonic baghouse (FIG. 4) and then cooled to near ambient conditions. A small portion of the $CO_2$ rich stream exiting the cooler is recycled back via conduit 235 to the non-mechanical valve 300 and the regenerator for aeration and fluidization purposes. The $CO_2$ component of the flue gas thus selectively absorbed by the sorbent in the absorber assembly 100 and released in the regenerator as a nearly pure $CO_2$ stream, is available for useful end uses or for sequestration.

A level is maintained in the downcomer duct 236 as the warm sorbent flows to the sorbent cooler. Maintaining the level ensures that the sorbent inventories in the absorber and regeneration assemblies are maintained. Sorbent cooling can be accomplished outside the regenerator as shown in FIG. 4 via regenerated sorbent cooling section 220, here, preferably using a moving bed cooler with imbedded cooling coils. The minimum aeration that is necessary for operating the moving bed is accomplished with flue gas, as the flue gas entrained by the sorbent flows downward along with the sorbent into the absorber assembly 100. In addition to cooling the sorbent, the cooler 220 also limits or prevents any reverse flow of flue gas from the absorber assembly 100 into to the regeneration assembly 200.

The sorbent flow rate out of the cooler section 220 of the regeneration assembly is controlled by non-mechanical valves such as a seal leg 244 (FIG. 1) or an L-valve 246 (FIG. 4) with flue gas as aeration gas 38. The selection of a non-mechanical valve depends upon the flow rate of sorbent through the valve, and the upstream and downstream systems that the valve connects to. Both types of non-mechanical valves limit or prevent the reverse flow of flue gas from the lower portion of the absorber to the regeneration assembly 200. Once the sorbent outflow rate from the regeneration assembly 200 to the absorber assembly 100 is controlled, the sorbent residence time in the heating section 210 of the regenerator is also controlled, as the sorbent level in the regenerator is controlled by the sorbent flow rate from the absorber assembly to the regenerator.

In any gas-sorbent system, attrition of sorbent is inevitable. The sorbent is typically made of materials that produces minimum attrition; otherwise, the process becomes uneconomical due to high cost of large quantities of make-up sorbent. The methods presented herein minimize attrition with configuration choices for various equipment and means by which aeration and fluidization gases as well as the incoming flue gas are introduced into various vessels. The configuration choices of sorbent disengagement from the gas stream in the absorber assembly also limits or eliminates potential erosion issues.

As attrition, however minimum, is unavoidable, measures are taken to avoid accumulation of fines in commercial operation. With the method presented in FIG. 1, the attrited fines are purged out of the absorber and regeneration assemblies on a continuous basis by withdrawing a small portion of circulating sorbent, preferably through the non-mechanical valve 300 between the absorber and regeneration assemblies. The sorbent withdrawn is classified externally (not shown in FIG. 1), the fines are purged and the sorbent is returned back to the system through an opening at the regenerator inlet. There are several ways to classify the sorbent including fines entrainment through fluidization. With the method presented in FIG. 4, the fines are purged as necessary from the regenerator cyclonic baghouse dipleg via route 234.

Based on the methods presented in this invention, commercial scale systems for $CO_2$ removal from power plant flue gas have been devised. As shown in FIG. 3, sizing of major equipment and layout of the system have been performed to treat flue gas from a 300 MWe plant. The methods presented herein for power plant scale commercial systems consider several key factors, including pressure drop in the absorber assembly, limiting absorber assembly temperature rise to less than 25° F., increasing the absorption capacity of the sorbent to near saturation levels before regenerating, internal circulation of sorbent within the absorber assembly, effective ways to regenerate and cool the sorbent, and means to handle extremely large global circulation rates of sorbent between the absorber and regeneration assemblies.

To achieve a low pressure drop of less than the preferable 25 inches of water column in the absorber assembly and at the same time handle extremely high volumetric flue gas flow rates, all major equipment shown for the method in FIG. 1 is shaped in prism (such as hollow rectangular prism) shapes, which simply means that the equipment shown in FIG. 1 extends into the paper that constitutes the length of the equipment. The elevation and top view of the equipment and method presented schematically in FIG. 1 is shown in FIG. 3. The outer dimensions and relative sizes of various equipment and layout arrangement in FIG. 3 correspond to flue gas flow from a 300 MWe power plant.

The shape, layout and arrangement of equipment in FIG. 3 favors scaling-up of equipment to even larger sizes. For a 300 MWe plant, the overall dimensions of the module to treat flue gas are about 80 feet long, 130 feet wide and 230 feet in height. For even larger power generation units such as a 880 MWe plant, one option is to designate use the method and design for a 300 MWe unit as a module and use three such modules for the whole unit. Another option is to extend the length of all major components. The width and height of the components remains unchanged. Similar considerations are given in sizing, layout and arrangement of equipment for method described schematically in FIG. 4 for sorbents that exhibit faster kinetics and high exothermic heat releases.

Between the embodiments presented herein in FIGS. 1 and 4, sorbents for $CO_2$ capture with slower kinetics and low heat release rates, as well as sorbents with faster kinetics and high release rates, can be accommodated. In some sense, the two methods cover extreme cases. As sorbent characteristics vary over a range, an optimum method for the sorbent selected can be developed by choosing appropriate equipment components from the two methods. Such an optimum commercial process will still be based on principles enumerated in the two methods presented in this invention and will thus be capable of handling large amount of flue gas from a modern power plant and achieve effective separation and production of essentially pure $CO_2$ gas stream.

EXAMPLE

Figure 7:
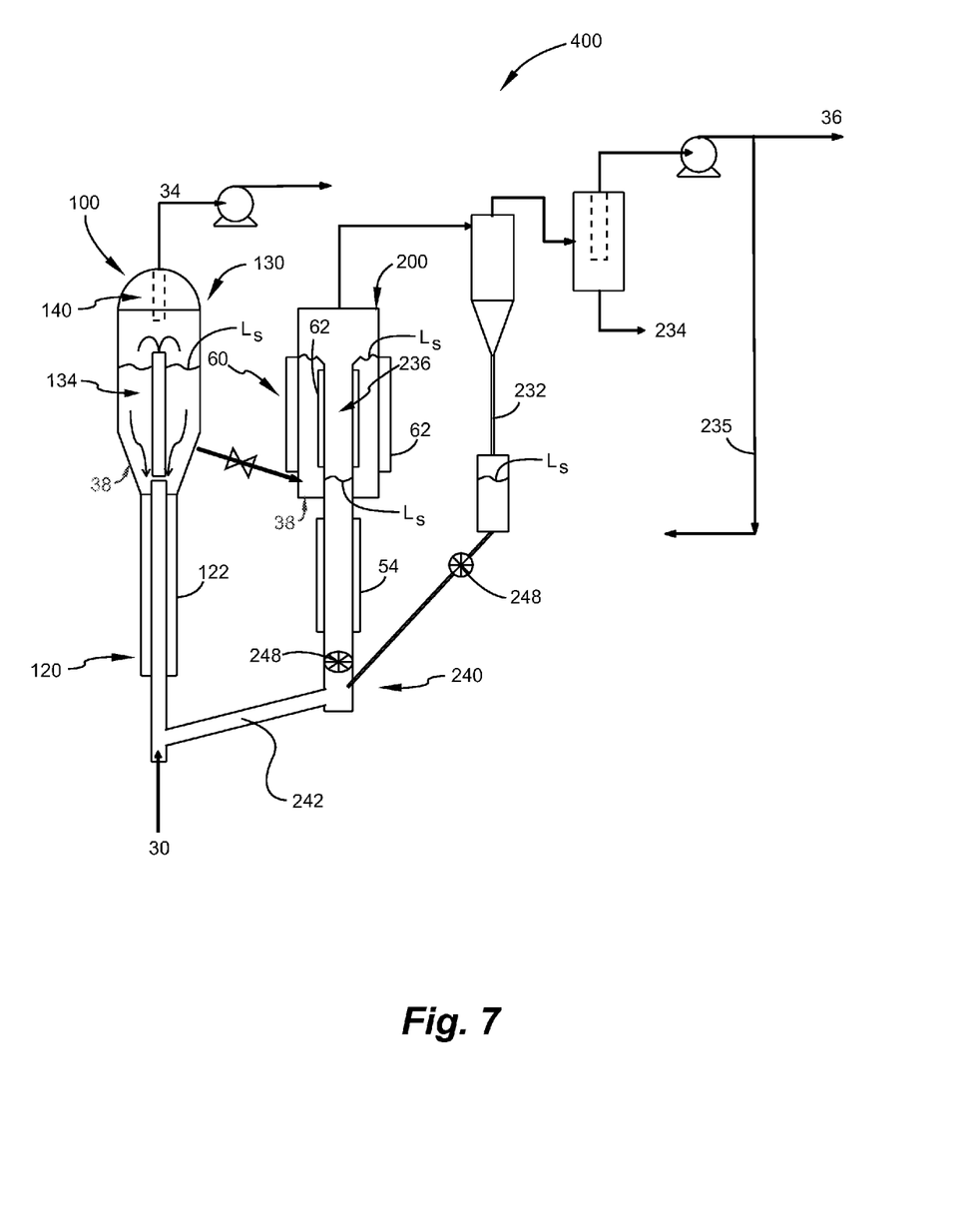
FIG. 7 is a schematic illustration of the absorber and regeneration assemblies of present invention according to another preferred embodiment, for flue gas absorption and sorbent regeneration and cooling on a continuous scale at a pilot test.

As an example of enumerating the concepts of present invention, a test apparatus 400, as shown in FIG. 7, has been built, and sorbents for their $CO_2$ capture ability has been tested on a continuous absorption and regeneration basis. This apparatus includes the major embodiments of the present invention, including the absorber assembly (as in FIG. 1), ICFB 130 (as in FIG. 1) and fluid bed regeneration of sorbent in annular space (as in FIG. 4).

In the test apparatus 400, as many different types of sorbent are being tested (both with low and high exothermic heat releases), the absorber riser section 120 was surrounded by a jacket cooler 122 to remove exothermic heat from absorption of $CO_2$. For industrial scale systems, the heat removal will be achieved by injecting the cooled, partially spent sorbent to the bottom of the absorber assembly 100 (FIG. 1 for sorbents with slower kinetics), or at various elevations along the height of the absorber assembly 100 (FIG. 4 for sorbents with faster kinetics).

The flue gas generated from the power plant is introduced to the absorber at the bottom of the absorber assembly 100, where the flue gas comes into contact with the sorbent from the regeneration assembly 200. The gas superficial velocity in the absorber riser section 120 is between 10-40 ft/s for test purposes, and the sorbent feed rate from the regeneration assembly 200 to a lower section of absorber assembly 100 in the test apparatus is metered by a rotary feeder 248. For large industrial systems, the rotary feeder 248 (or other such devices as screw feeder and closed belt feeder) is impractical. Non-mechanical valves, such seal leg and L-valve (FIGS. 1 and 4) can then be used, and the regenerated sorbent rates to the absorber assembly 100 are easily regulated by controlling the aeration rates.

In the top of the absorber assembly 100 in the test apparatus 400 as shown in FIG. 7, the ICFB 130 has been installed and is operating well. Partially spent sorbent is recycled back to upper portion of the absorber assembly 100 using ICFB. The sorbent further reacts with residual $CO_2$ in the flue gas and improves utilization of remaining capacity of the sorbent. Control of aerations at various locations inside the ICFB gives precise control over partially spent sorbent circulation rates. The $CO_2$ lean flue gas 34 is released from the top of the absorber assembly 100 through a particle collection filter of the filter section 140.

The consumed sorbent flows from the ICFB to the regeneration assembly 200. The regeneration assembly 200 is a fluidized bed reactor and is heated through a heating assembly 60, here via heating the outer wall by an electric heating blanket 62 in the test apparatus. The fluidized bed is maintained uniformly at desired high temperature for regeneration. The sorbent that enters the fluidized bed is rapidly heated up as it mixes with hot sorbent in the regenerator, releasing $CO_2$. The regenerated sorbent then overflows to a downcomer pipe 236 and is drained out of the regeneration assembly 200. The center downcomer pipe 236 is also surrounded by a heating blanket 62 for additional heat input into the fluidized bed. The sorbent is cooled with a jacketed cooler 54 in the downcomer pipe in the test facility. The regenerated sorbent is fed into the absorber assembly by the rotary feeder 248.

A pilot test unit was designed to operate at a relatively low sorbent-to-gas ratio of approximately 4 to minimize the pressure drop in the absorber assembly to less than 10 inches of water column. This was not the optimum design for all different types of sorbent that will be tested. At this low sorbent-to-gas ratio, sorbents that exhibit high exothermic heat release will have a much higher than desirable riser temperature. At the pilot test unit, the riser temperature was controlled by a cooling water jacket.

The pilot test unit operated with flue gas at approximately 130° F. from the power plant, flowing into the bottom of the absorber riser at approximately 15 ft/s, and mixing with cooled regenerated sorbent. With a sorbent that had high exothermic heat release and faster kinetics, the highest temperature observed in the riser was approximately 180° F. at about 10 feet above the inlet.

With jacketed cooling, the gas-sorbent mixture entered the ICFB riser at approximately 139° F. The cooler sorbent circulating internally within the ICFB further cooled the gas-sorbent mixture to approximately 122° F. as there was much more sorbent circulating within the ICFB and most of the $CO_2$ capture occurred in a lower part of the absorber riser. The sorbent captured more than 90% of the $CO_2$ in the flue gas.

The observed pressure drop across the absorber and ICFB risers was approximately 5 inches of water column (3 inches of water column in the 30 feet tall absorber riser and 2 inches of water column in the 8 feet tall ICFB riser). The models that were developed accurately predicted the observed temperature rise and the pressure drop at the pilot plant for a sorbent-to-gas ratio of approximately 4. The same models also predict that for a commercial system, at a sorbent-to-gas ratio of approximately 10, the maximum temperature in the absorber riser will be approximately 153° F. with the same sorbent, which amounts to a temperature rise of approximately 23° F. with a flue gas inlet temperature of approximately 130° F.

In this commercial case with 200 feet tall absorber system, the pressure drop across the absorber assembly will be 25 inches of water column at 15 ft/s superficial gas velocity. The pressure drop will be much less at higher gas velocities. The 15 ft/s gas velocity was chosen for the pilot plant to provide about a 2 second residence time in the absorber riser and about a 0.5 second residence time in the ICFB riser. The sorbent tested had a mean particle size of 40 microns.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A species transfer system for transferring at least one species from an inlet stream having a first concentration of the species, to a controlled species outlet stream, comprising:
   an absorber assembly having an inlet for the inlet stream and an outlet for a lean species stream having a second concentration of the species being lower than the first concentration of the species of the inlet stream;
   sorbent located in the absorber assembly to capture at least a portion of the species from the inlet stream, and becoming at least partially spent sorbent upon species capture;
   a regeneration assembly having an inlet, and an outlet for the controlled species outlet stream; and
   the at least partially spent sorbent located in the regeneration assembly releasing at least a portion of the captured species from the absorber assembly to the controlled species outlet stream;
   wherein the species transfer system can effectively handle an inlet stream flow rate of at least approximately 11,500 ft$^3$/sec; and
   wherein the species transfer system provides 90% species capture, such that the lean species stream has less than approximately 10% of the species concentration of the inlet stream.

2. The species transfer system of claim 1, wherein the overall pressure drop in the absorber assembly, from inlet to outlet, is less than 25 inches of water column.

3. The species transfer system of claim 1, wherein the overall temperature increase in the absorber assembly is less than 25° F.

4. The species transfer system of claim 1, wherein the at least partially spent sorbent is separated from the inlet gas by a two step gas-sorbent separation process comprising gravity disengagement and filtration.

5. The species transfer system of claim 1, wherein the absorber assembly comprises:
   a cone section defining the inlet for the inlet stream and providing sorbent plugging limiting means;
   a riser section in communication with the cone section, where mixing of the inlet stream and sorbent occur;
   a circulation section in communication with the riser section to circulate the at least partially spent sorbent through the inlet stream;
   a filter section to filter the inlet stream prior to its exhaust from the absorber assembly as the lean species stream; and
   a sorbent recycling section to transfer sorbent from one or more of the circulation and filter sections to the cone section.

6. The species transfer system of claim 5, wherein the cone section has a primary inlet stream inlet, and at least one secondary inlet stream inlet, wherein at least approximately 60% of the inlet stream enters the absorber assembly via the primary inlet stream inlet, and wherein the remaining portion of the inlet stream enters the absorber assembly via the at least one secondary inlet stream inlet.

7. The species transfer system of claim 5, wherein the circulation section comprises an internally circulating fluidized bed, and wherein the internally circulating fluidized bed circulates the at least partially spent sorbent through the inlet stream until the sorbent reaches approximately its saturation level.

8. The species transfer system of claim 5, wherein the filter section comprises a baghouse to filter sorbent particulates in the inlet stream prior to its exhaust from the absorber assembly as the lean species stream.

9. The species transfer system of claim 5, wherein the absorber assembly further comprises at least one absorber cooling assembly to provide control of the temperature in the absorber assembly.

10. The species transfer system of claim 1, wherein the regeneration assembly comprises:
    an at least partially spent sorbent heating section to drive captured species in the at least partially spent sorbent out of the sorbent, and into a regeneration assembly outlet stream;
    a regenerated sorbent cooling section to cool the regenerated sorbent prior to its return to the absorber assembly;
    a filter section to filter the regeneration assembly outlet stream prior to its exhaust from the regeneration assembly as the controlled species outlet stream; and
    a sorbent return section to transfer cooled regenerated sorbent from the regenerated sorbent cooling section to the absorber section.

11. A species transfer system for transferring $CO_2$ from the flue gas of a power plant having a first concentration of $CO_2$, to a $CO_2$ rich gas stream, comprising:
    an absorber assembly having an inlet for the flue gas and an outlet for a $CO_2$ lean gas stream having a second concentration of $CO_2$ being lower than the first concentration of $CO_2$ of the flue gas;
    sorbent located in the absorber assembly to capture at least a portion of the $CO_2$ from the flue gas, and becoming at least partially spent sorbent upon $CO_2$ capture;
    a regeneration assembly having an inlet, and an outlet for the $CO_2$ rich gas stream; and
    the at least partially spent sorbent located in the regeneration assembly releasing at least a portion of the captured $CO_2$ from the absorber assembly to the $CO_2$ rich gas stream;
    wherein the species transfer system can effectively handle a flue gas flow rate of at least approximately 11,500 ft$^3$/sec; and
    wherein the species transfer system provides 90% $CO_2$ capture, such that the $CO_2$ lean gas stream has less than approximately 10% of the $CO_2$ concentration of the flue gas.

12. The species transfer system of claim 11, wherein the overall pressure drop in the absorber assembly, from inlet to outlet, is less than 25 inches of water column.

13. The species transfer system of claim 11, wherein the overall temperature increase in the absorber assembly is less than 25° F.

14. The species transfer system of claim 11, wherein the at least partially spent sorbent is separated from the flue gas by a two step gas-sorbent separation process comprising gravity disengagement and filtration.

15. A system for contacting power plant flue gas with solid sorbent to absorb $CO_2$ from the flue gas comprising:
   an absorber assembly to remove portions of $CO_2$ from the flue gas comprising:
      an absorber riser having sorbent, wherein the flue gas comes in contact with the sorbent to form at least partially spent sorbent, and wherein the sorbent and gas flow velocity in the absorber riser is in the range of approximately 10 to 40 ft/sec;
      an internally circulating fluidized bed (ICFB) in communication with the absorber riser, wherein the flowing flue gas comes in contact with additional sorbent;
      a gravity disengagement and baghouse filtration system in communication with the internally circulating fluidized bed to separate particles of the at least partially spent sorbent from the flue gas that has become progressively leaner of $CO_2$ before the lean $CO_2$ gas stream exits the absorber assembly; and
      a sorbent return leg to return sorbent from the gravity disengagement and baghouse filtration system to the absorber riser;
   a seal pot acting as a non-mechanical valve; and
   a regeneration assembly to regenerate at least a portion of the at least partially spent sorbent and release captured $CO_2$ into a $CO_2$ rich gas stream, the regeneration assembly comprising:
      a fluidized bed regenerator where the at least partially spent sorbent is heated to drive off captured $CO_2$ into the $CO_2$ rich gas stream, and where the regenerated sorbent is then cooled; and
      a regeneration return leg to return the regenerated and cooled sorbent back to the absorber assembly.

16. The system of claim 15, wherein the flue gas enters the absorber riser through an L-shaped rectangular cone that both limits sorbent plugging at the flue gas entrance into the absorber riser, and promotes the mixing of flue gas with sorbent.

17. The system of claim 15, wherein the at least partially spent sorbent nears saturation levels of $CO_2$ by internally circulating the at least partially spent sorbent in the ICFB.

18. The system of claim 15, wherein the overall pressure drop in the absorber assembly is less than 25 inches of water column.

19. The system of claim 17, wherein the at least partially spent sorbent circulation rate in the ICFB is regulated by controlling aeration to a reverse weir opening in the absorber riser.

20. The system of claim 15, wherein the sorbent particles collected by the baghouse filtration system flows to an absorber standpipe, and wherein the at least partially spent sorbent is cooled and reinjected into the lower portion of the absorber riser to control the absorption temperature increase in the absorber riser to less than approximately 25° F.

* * * * *